United States Patent
Arora et al.

(10) Patent No.: US 11,902,404 B1
(45) Date of Patent: Feb. 13, 2024

(54) RETAINING KEY PARAMETERS AFTER A TRANSMISSION CONTROL PROTOCOL (TCP) SESSION FLAP

(71) Applicant: Juniper Networks, Inc., Sunnyvale, CA (US)

(72) Inventors: Amit Arora, Bangalore (IN); Erin C. MacNeil, Carp (CA); Harmeet Singh, Bangalore (IN); Sairam Neelam, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/837,406

(22) Filed: Jun. 10, 2022

(51) Int. Cl.
| | |
|---|---|
| H04L 47/62 | (2022.01) |
| H04L 45/74 | (2022.01) |
| H04W 28/10 | (2009.01) |
| H04W 28/02 | (2009.01) |
| H04L 69/163 | (2022.01) |
| H04L 69/22 | (2022.01) |
| H04L 47/193 | (2022.01) |
| H04L 47/28 | (2022.01) |
| H04L 43/04 | (2022.01) |

(52) U.S. Cl.
CPC ............ H04L 69/163 (2013.01); H04L 43/04 (2013.01); H04L 47/193 (2013.01); H04L 47/28 (2013.01); H04L 69/22 (2013.01)

(58) Field of Classification Search
CPC ..... H04L 69/163; H04L 43/04; H04L 47/193; H04L 47/28; H04L 69/22
See application file for complete search history.

(56) References Cited

U.S. PATENT DOCUMENTS

| | | | |
|---|---|---|---|
| 7,940,650 B1 | 5/2011 | Sandhir et al. | |
| 9,191,399 B2* | 11/2015 | Davis | H04L 63/1416 |
| 10,541,889 B1* | 1/2020 | Mishra | H04L 43/08 |
| 11,272,034 B2 | 3/2022 | Shribman et al. | |
| 2012/0063493 A1* | 3/2012 | Hasegawa | H04L 47/724 |
| | | | 375/296 |
| 2014/0003227 A1* | 1/2014 | Scudder | H04L 69/40 |
| | | | 370/218 |

(Continued)

OTHER PUBLICATIONS

NetworkLessons.com, TCP Header, Sep. 3, 2017, URL retrieved via: https://networklessons.com/cisco/ccie-routing-switching-written/tcp-header (Year: 2017).*

(Continued)

Primary Examiner — Schquita D Goodwin
(74) Attorney, Agent, or Firm — Harrity & Harrity, LLP

(57) ABSTRACT

A network device may monitor a TCP session with another network device, and may identify ingress and/or egress packets, a TCP header, and a socket of the TCP session. The network device may inspect the ingress and/or egress packets, the TCP header, and the socket to identify a zero window advertisement, details of a last quantity of packets sent or received, synchronize, finish, or reset packets sent or received, negotiated TCP options, or buffer space utilization, and may temporarily record identified data based on the inspection. The network device may detect a TCP session flap when a finish packet or a reset packet is identified and recorded, and may store, in a dead TCP session list, the identified data based on the TCP session flap being detected.

20 Claims, 11 Drawing Sheets

(56) References Cited

U.S. PATENT DOCUMENTS

| | | | | |
|---|---|---|---|---|
| 2014/0064119 A1* | 3/2014 | Iizuka | ............... | H04L 43/0829 370/252 |
| 2014/0337506 A1* | 11/2014 | Sweeney | ............ | H04L 41/0672 709/224 |
| 2015/0113118 A1* | 4/2015 | Jain | ...................... | H04L 41/145 709/224 |
| 2017/0078170 A1* | 3/2017 | Vasseur | ................ | H04L 41/142 |
| 2017/0373950 A1* | 12/2017 | Szilagyi | ............. | H04L 47/2416 |
| 2019/0190831 A1* | 6/2019 | Lopez Serrano | ..... | H04L 47/122 |
| 2020/0366586 A1* | 11/2020 | Smarda | ................ | H04L 41/142 |
| 2020/0382396 A1* | 12/2020 | Scott | ....................... | H04L 69/16 |
| 2021/0194999 A1* | 6/2021 | Du | .......................... | H04L 45/50 |
| 2021/0377139 A1* | 12/2021 | Holness | ............. | H04L 41/0654 |
| 2021/0409271 A1* | 12/2021 | Jacob Da Silva | .. | H04L 41/0853 |
| 2022/0131807 A1* | 4/2022 | Srinivas | ............. | H04L 47/2458 |

OTHER PUBLICATIONS

"Go Beyond—About Wireshark," Website: https://www.wireshark.org; Jul. 9-14, 2022, 10 Pages.

\* cited by examiner

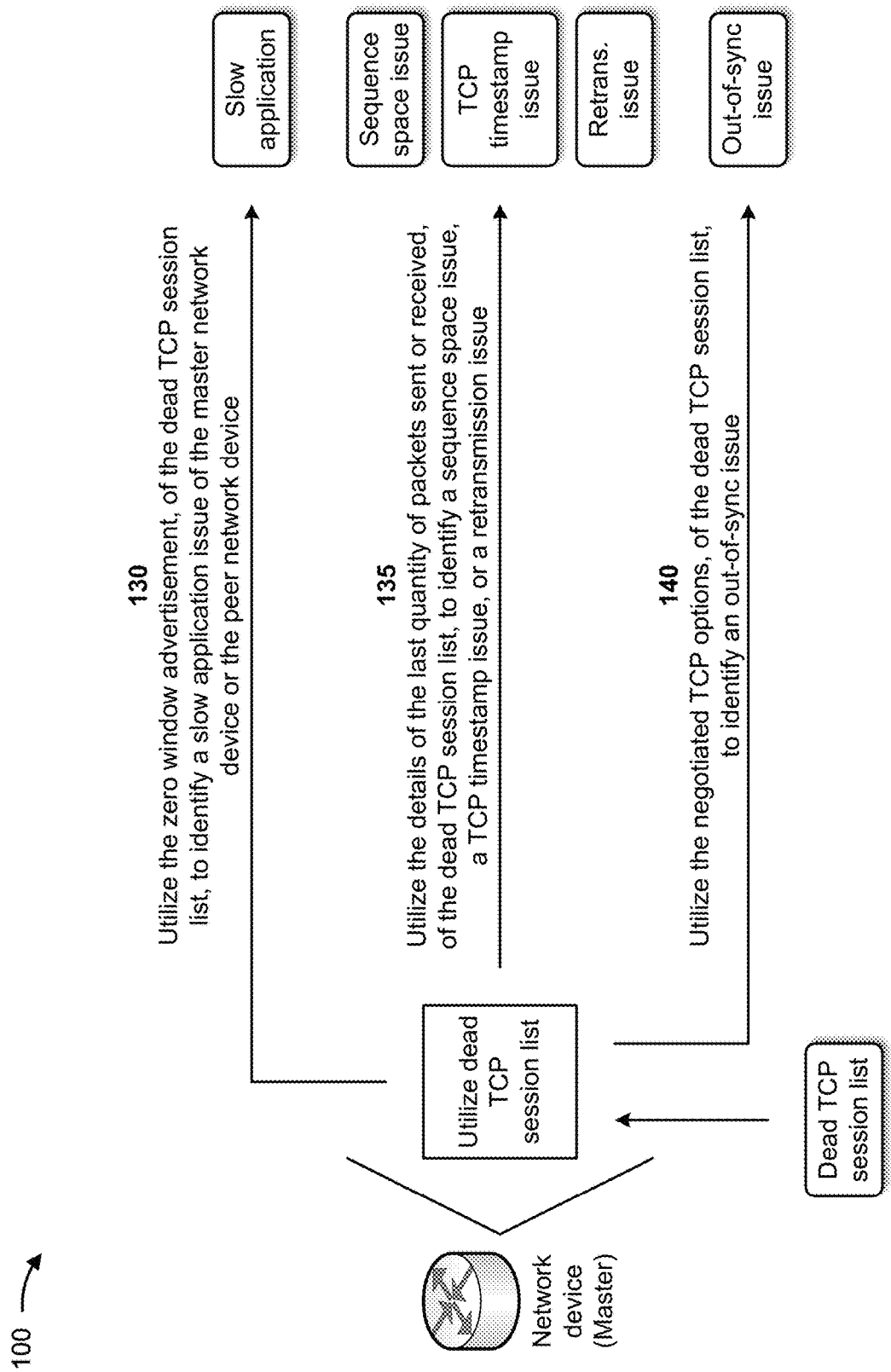

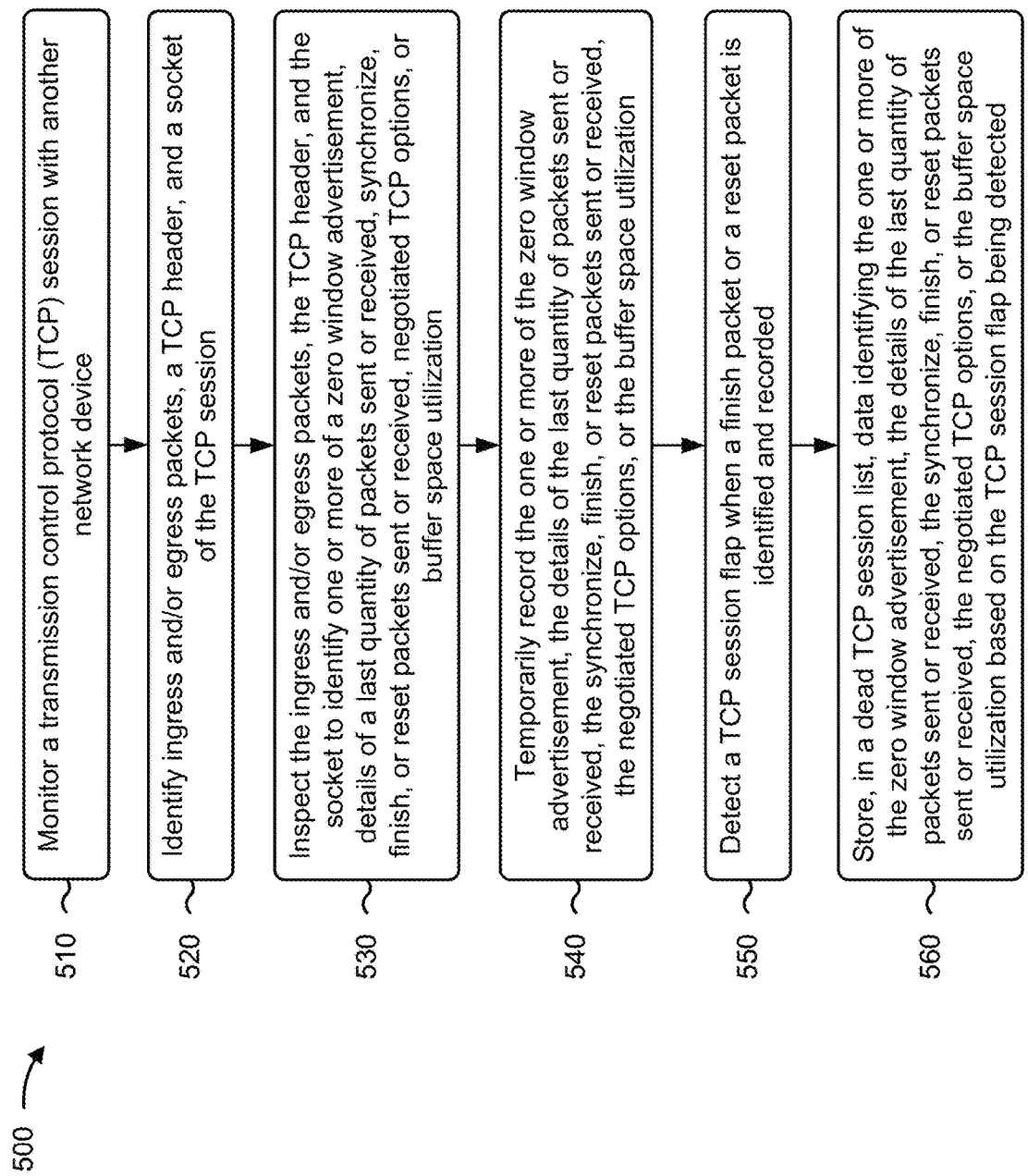

RETAINING KEY PARAMETERS AFTER A TRANSMISSION CONTROL PROTOCOL (TCP) SESSION FLAP

BACKGROUND

A TCP session of a master network device may flap (e.g., become unstable) due to a variety of reasons, such as a continuous zero window being advertised by a peer network device (e.g., which may create backpressure on a send channel), a continuous zero window being advertised by the master network device (e.g., due to an application not consuming data), an issue with a negotiated TCP option (e.g., a timestamp, a selective acknowledgment (SAck), security, and/or the like), network congestion, traffic blackholing, and/or the like.

SUMMARY

Some implementations described herein relate to a method. The method may include monitoring a TCP session with another network device, and identifying ingress and/or egress packets, a TCP header, and a socket of the TCP session. The method may include inspecting the ingress and/or egress packets, the TCP header, and the socket to identify one or more of a zero window advertisement, details of a last quantity of packets sent or received, synchronize, finish, or reset packets sent or received, negotiated TCP options, or buffer space utilization, and temporarily recording the one or more of the zero window advertisement, the details of the last quantity of packets sent or received, the synchronize, finish, or reset packets sent or received, the negotiated TCP options, or the buffer space utilization. The method may include detecting a TCP session flap when a finish packet or a reset packet is identified and recorded, and storing, in a dead TCP session list, data identifying the one or more of the zero window advertisement, the details of the last quantity of packets sent or received, the synchronize, finish, or reset packets sent or received, the negotiated TCP options, or the buffer space utilization based on the TCP session flap being detected.

Some implementations described herein relate to a network device. The network device may include one or more memories and one or more processors. The one or more processors may be configured to monitor a TCP session with another network device, and identify ingress and/or egress packets, a TCP header, and a socket of the TCP session. The one or more processors may be configured to inspect the ingress and/or egress packets, the TCP header, and the socket to identify one or more of a zero window advertisement, details of a last quantity of packets sent or received, synchronize, finish, or reset packets sent or received, negotiated TCP options, or buffer space utilization, and temporarily record the one or more of the zero window advertisement, the details of the last quantity of packets sent or received, the synchronize, finish, or reset packets sent or received, the negotiated TCP options, or the buffer space utilization. The one or more processors may be configured to detect a TCP session flap when a finish packet or a reset packet is identified and recorded, and store, in a dead TCP session list, data identifying the one or more of the zero window advertisement, the details of the last quantity of packets sent or received, the synchronize, finish, or reset packets sent or received, the negotiated TCP options, or the buffer space utilization based on the TCP session flap being detected. The one or more processors may be configured to provide, for display, the data identifying the one or more of the zero window advertisement, the details of the last quantity of packets sent or received, the synchronize, finish, or reset packets sent or received, the negotiated TCP options, or the buffer space utilization based on the TCP session flap being detected.

Some implementations described herein relate to a non-transitory computer-readable medium that stores a set of instructions for a network device. The set of instructions, when executed by one or more processors of the network device, may cause the network device to monitor a TCP session with another network device, and identify ingress and/or egress packets, a TCP header, and a socket of the TCP session. The set of instructions, when executed by one or more processors of the network device, may cause the network device to inspect the ingress and/or egress packets, the TCP header, and the socket to identify one or more of a zero window advertisement, details of a last quantity of packets sent or received, synchronize, finish, or reset packets sent or received, negotiated TCP options, or buffer space utilization, and temporarily record the one or more of the zero window advertisement, the details of the last quantity of packets sent or received, the synchronize, finish, or reset packets sent or received, the negotiated TCP options, or the buffer space utilization. The set of instructions, when executed by one or more processors of the network device, may cause the network device to detect a TCP session flap when a finish packet or a reset packet is identified and recorded, and store, in a dead TCP session list, data identifying the one or more of the zero window advertisement, the details of the last quantity of packets sent or received, the synchronize, finish, or reset packets sent or received, the negotiated TCP options, or the buffer space utilization based on the TCP session flap being detected. The set of instructions, when executed by one or more processors of the network device, may cause the network device to utilize the one or more of the zero window advertisement, the details of the last quantity of packets sent or received, the synchronize, finish, or reset packets sent or received, the negotiated TCP options, or the buffer space utilization based on the TCP session flap being detected to identify one or more issues.

BRIEF DESCRIPTION OF THE DRAWINGS

FIG. 5 is a flowchart of an example process for retaining key parameters after a TCP session flap.

DETAILED DESCRIPTION

Figure 1A:
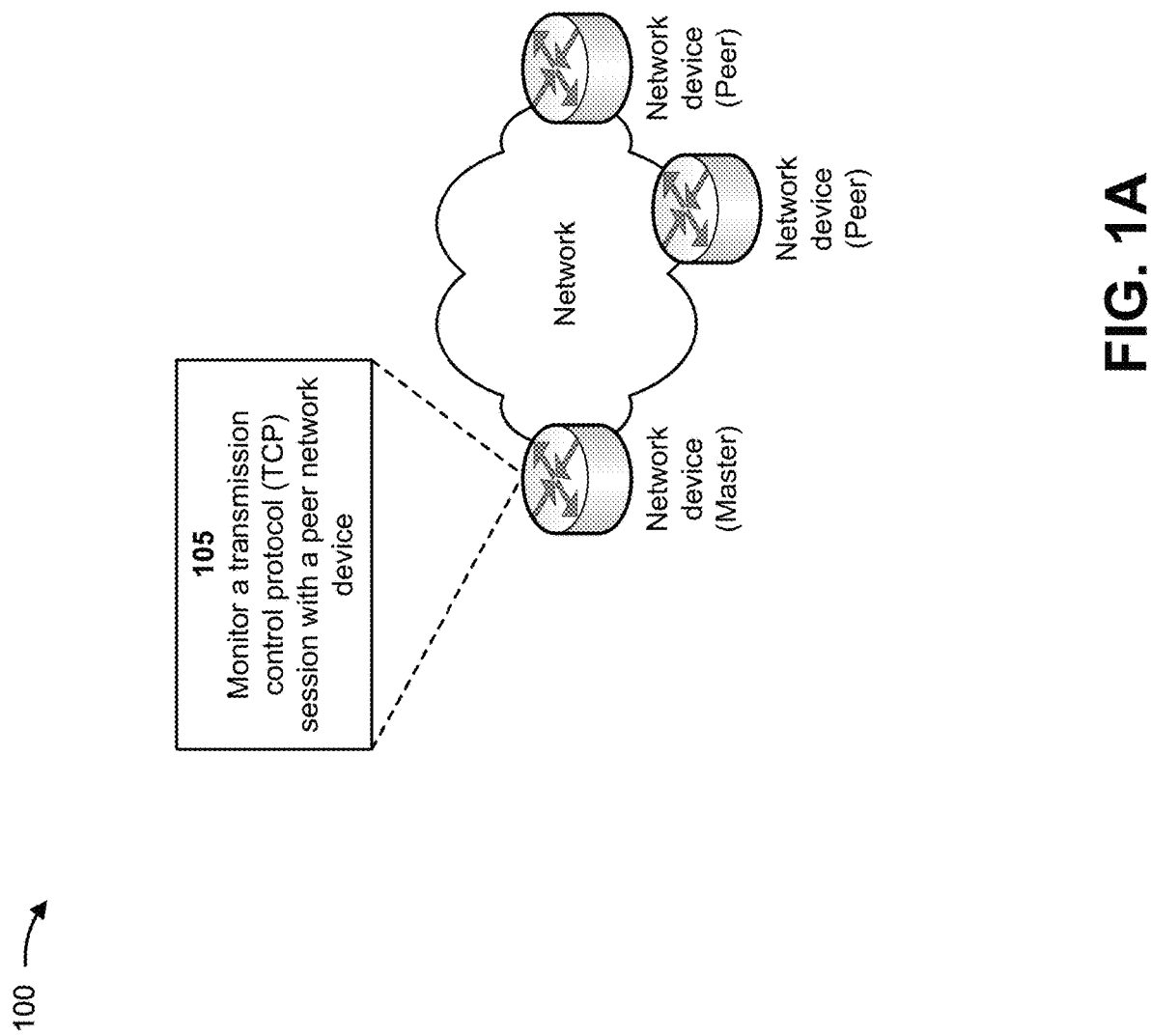
FIGS. 1A-IG are diagrams of an example associated with retaining key parameters after a TCP session flap.

The following detailed description of example implementations refers to the accompanying drawings. The same reference numbers in different drawings may identify the same or similar elements.

To debug and root cause a TCP session flap typically requires reproduction of an issue (e.g., that causes the TCP session flap) via debug-enabled information (e.g., a TCP session dump) and regular snapshots of network information (e.g., via netstat) and socket statistics. However, reproduction of the issue requires significant effort and may result in failure to reproduce the issue. Even if an issue can be reproduced, the debug-enabled information, the network information, and the socket statistics collected for highly-scaled networks (e.g., collecting a TCP session dump for hours), with a scaled topology of thousands of TCP sessions with a great input/output rate, may include a large quantity of data. Reproducing the issue from such a large quantity of data may require data mining and identifying the issue based on the data mining. Thus, current techniques for reproducing an issue that causes a TCP session flap consume computing resources (e.g., processing resources, memory resources, communication resources, and/or the like), networking resources, and/or the like, associated with identifying the issue that causes the TCP session flap, failing to provide information associated with the TCP session flap, failing to correct the TCP session flap due to the lack of information associated with the TCP session flap, losing a TCP session due to the TCP session flap, losing traffic due to the TCP session flap, and/or the like.

Some implementations described herein relate to a network device that retains key parameters after a TCP session flap. For example, a network device may monitor a TCP session with another network device, and may identify ingress and/or egress packets, a TCP header, and a socket of the TCP session. The network device may inspect the ingress and/or egress packets, the TCP header, and the socket to identify one or more of a zero window advertisement, details of a last quantity of packets sent or received, synchronize, finish, or reset packets sent or received, negotiated TCP options, or buffer space utilization, and may temporarily record the one or more of the zero window advertisement, the details of the last quantity of packets sent or received, the synchronize, finish, or reset packets sent or received, the negotiated TCP options, or the buffer space utilization. The network device may detect a TCP session flap when a finish packet or a reset packet is identified and recorded, and may store, in a dead TCP session list, data identifying the one or more of the zero window advertisement, the details of the last quantity of packets sent or received, the synchronize, finish, or reset packets sent or received, the negotiated TCP options, or the buffer space utilization based on the TCP session flap being detected.

In this way, the network device retains key parameters after a TCP session flap. For example, the network device (e.g., a master network device) may inspect TCP headers and sockets of ingress and/or egress packets and may record information associated with the packets based on the inspection. The information may include zero window advertisements in either direction (e.g., from or to a peer network device), time stamps associated with the packets, details associated with a last quantity of packets sent and/or received, TCP headers, synchronize (SYN) packets, finish (FIN) packets, and/or reset (RST) packets sent and/or received, negotiated TCP options, send/receive buffer space utilization, and/or the like. The network device may store the information in a dead TCP session list, may output the information, and/or may utilize the information to identify issues associated with the network device. Thus, the network device conserves computing resources, networking resources, and/or the like that would otherwise have been consumed by identifying the issue that causes the TCP session flap, failing to provide information associated with the TCP session flap, failing to correct the TCP session flap due to the lack of information associated with the TCP session flap, losing a TCP session due to the TCP session flap, losing traffic due to the TCP session flap, and/or the like.

FIGS. 1A-1G are diagrams of an example 100 associated with retaining key parameters after a TCP session flap. As shown in FIGS. 1A-1G, example 100 includes a network with a plurality of network devices. One network device may be a master network device that is associated with a plurality of peer network devices. Further details of the network and the network devices are provided elsewhere herein.

As shown in FIG. 1A, and by reference number 105, the network device may monitor a TCP session with a peer network device. For example, the network device (e.g., a master network device) may establish a TCP session with another network device (e.g., a peer network device). The master network device may contact the peer network device and request a TCP connection. The TCP connection may be established via a three-way handshake. The three-way handshake may define a start of a new TCP connection, and may prevent the master network device from associating duplicate packets, generated by a previous TCP connection, with the new TCP connection. The master network device may provide a TCP segment to the peer network device with a synchronize (SYN) flag set to one (1) and an acknowledgement (ACK) flag set to zero (0). The peer network device may return, to the master network device, a TCP segment in which both the SYN and ACK flags are set to one (1). The master network device may acknowledge to the peer network device that the ACK flag is received by providing, to the peer network device, a TCP segment with the ACK flag set to one (1) and the SYN flag set to zero (0). After the TCP connection is established and/or during the three-way handshake, various control parameters for the TCP connection may be negotiated between the master network device and the peer network device. After data transmission begins for the TCP session, a sliding window flow-control scheme may be utilized to manage data transfer.

In some implementations, the network device may exchange TCP session data with the peer network device during the TCP session. The network device may monitor the TCP session and the TCP session data exchanged with the peer network device during the TCP session. The TCP session data may include ingress and/or egress packets exchanged by the network device and the peer network device during the TCP session, a TCP header associated with the TCP session, a socket of the TCP session, and/or the like.

Figure 1B:
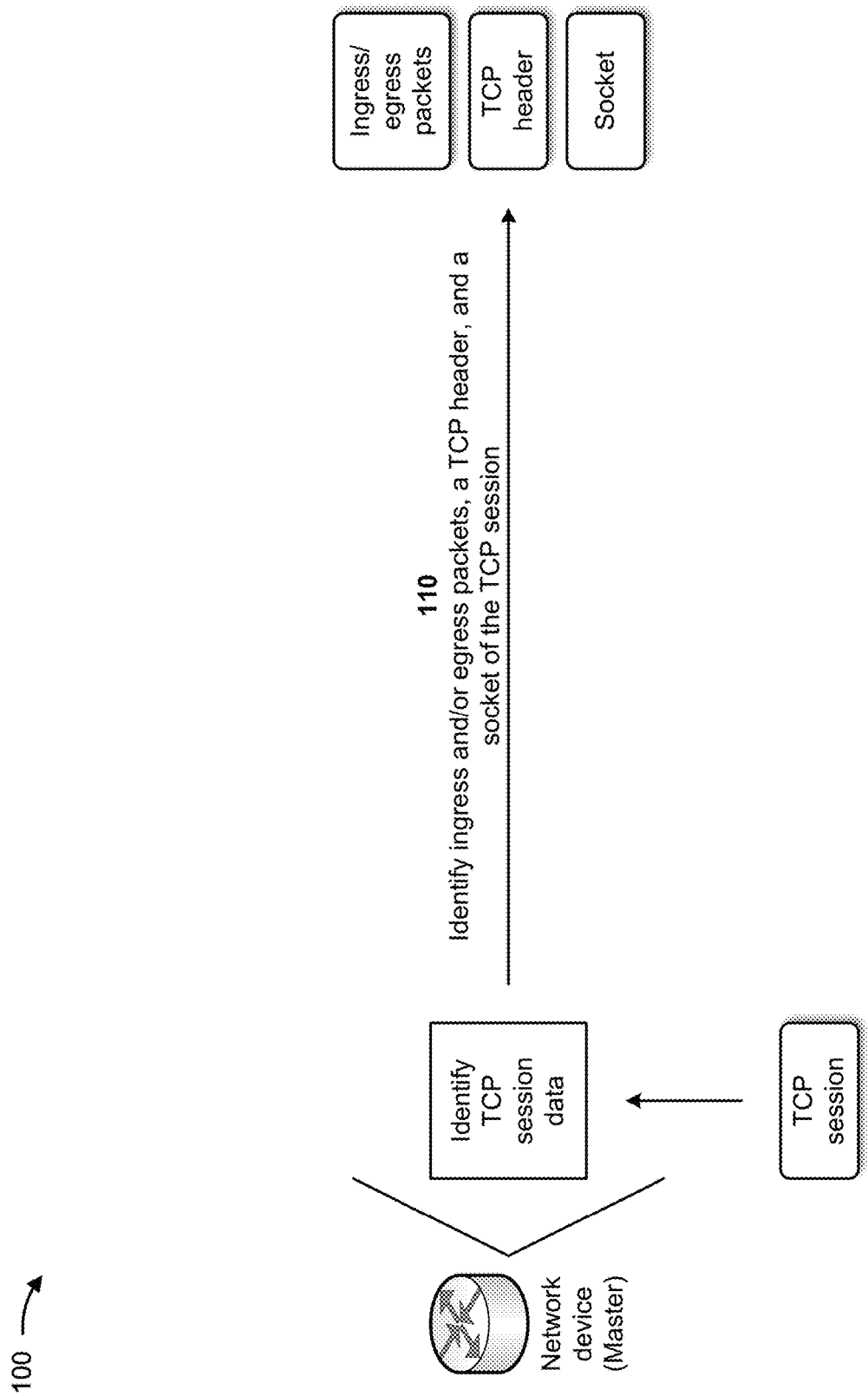

As shown in FIG. 1B, and by reference number 110, the network device may identify ingress and/or egress packets, a TCP header, and a socket of the TCP session. For example, the network device may analyze the TCP session data exchanged with the peer network device during the TCP session, and may identify the ingress and/or egress packets exchanged by the network device and the peer network device during the TCP session, the TCP header associated with the TCP session, the socket of the TCP session, and/or the like, based on analyzing the TCP session data.

Figure 1C:
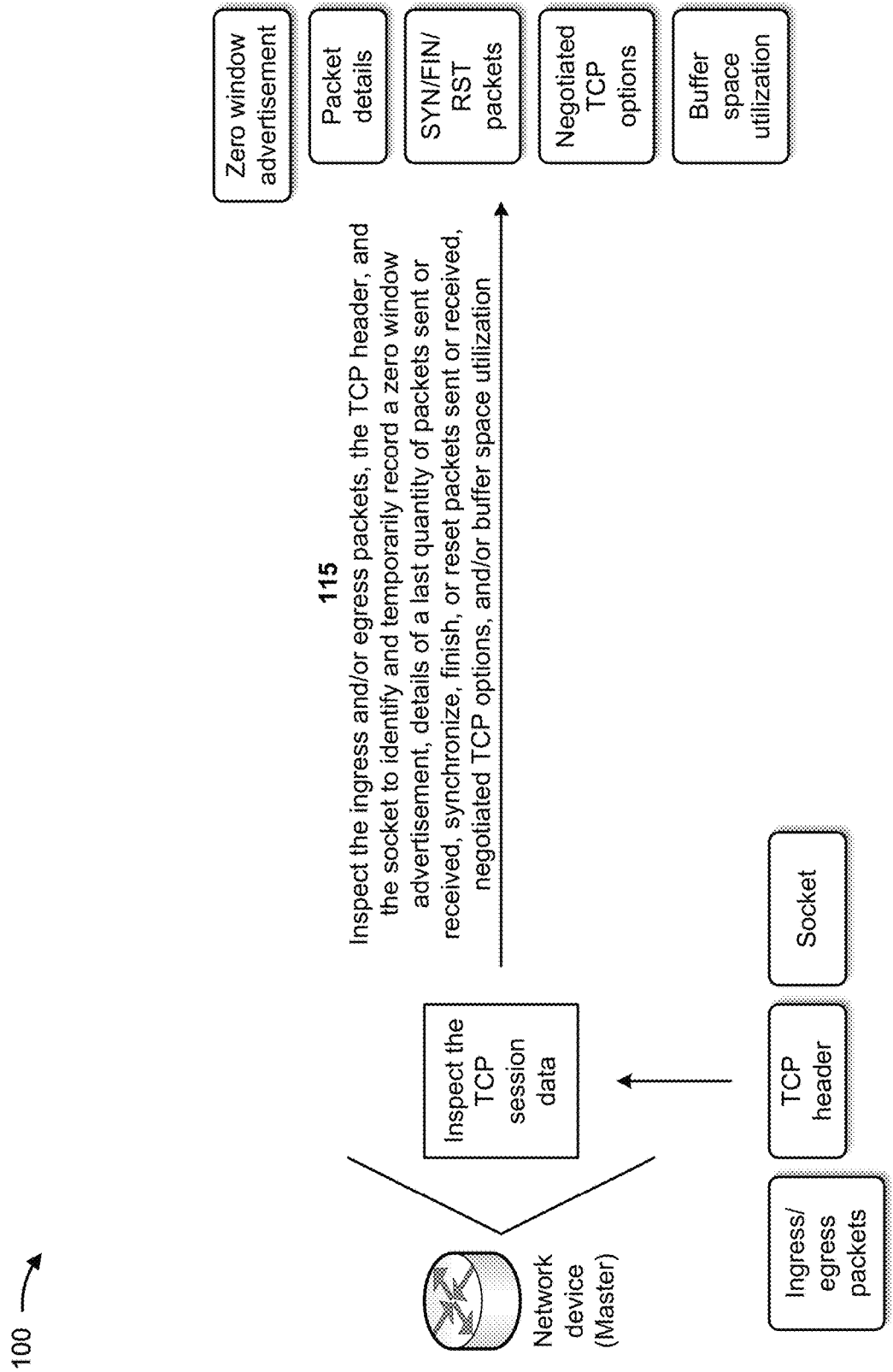

As shown in FIG. 1C, and by reference number 115, the network device may inspect the ingress and/or egress packets, the TCP header, and the socket to identify and temporarily record a zero window advertisement, details of a last quantity of packets sent or received, synchronize, finish, or reset packets sent or received, negotiated TCP options, and/or buffer space utilization. For example, the network device may inspect the ingress and/or egress packets, the TCP header, and the socket, and may identify information associated with the ingress and/or egress packets based on inspecting the ingress and/or egress packets, the TCP header, and the socket. The information associated with the ingress and/or egress packets may include zero window advertisements (e.g., maximum durations and/or time stamps) in either direction (e.g., from or to the peer network device), details (e.g., maximum durations and/or time stamps) of a last quantity of packets sent or received by the network device, synchronize (SYN) finish (FIN), or reset (RST) packets in either direction, negotiated TCP options, send and/or receive buffer space utilization, and/or the like.

In some implementations, the network device may include a kernel software module with a packet filter (e.g., netfilter) that inspects the ingress and/or egress packets, the TCP header, and the socket to identify the zero window advertisement, the details of the last quantity of packets sent or received, the synchronize, finish, or reset packets sent or received, the negotiated TCP options, the buffer space utilization, and/or the like. The network device may inspect one or more TCP sessions implemented by the network device, and may identify each of the TCP sessions based on a source network address (e.g., an Internet protocol (IP)), a destination network address, a source port number, a destination port number, a virtual routing and forwarding (VRF) identifier, and/or the like. In some implementations, the network device may temporarily store (e.g., in a cache or temporary storage) data identifying the zero window advertisement, the details of the last quantity of packets sent or received, the synchronize, finish, or reset packets sent or received, the negotiated TCP options, the buffer space utilization, and/or the like.

Figure 1D:
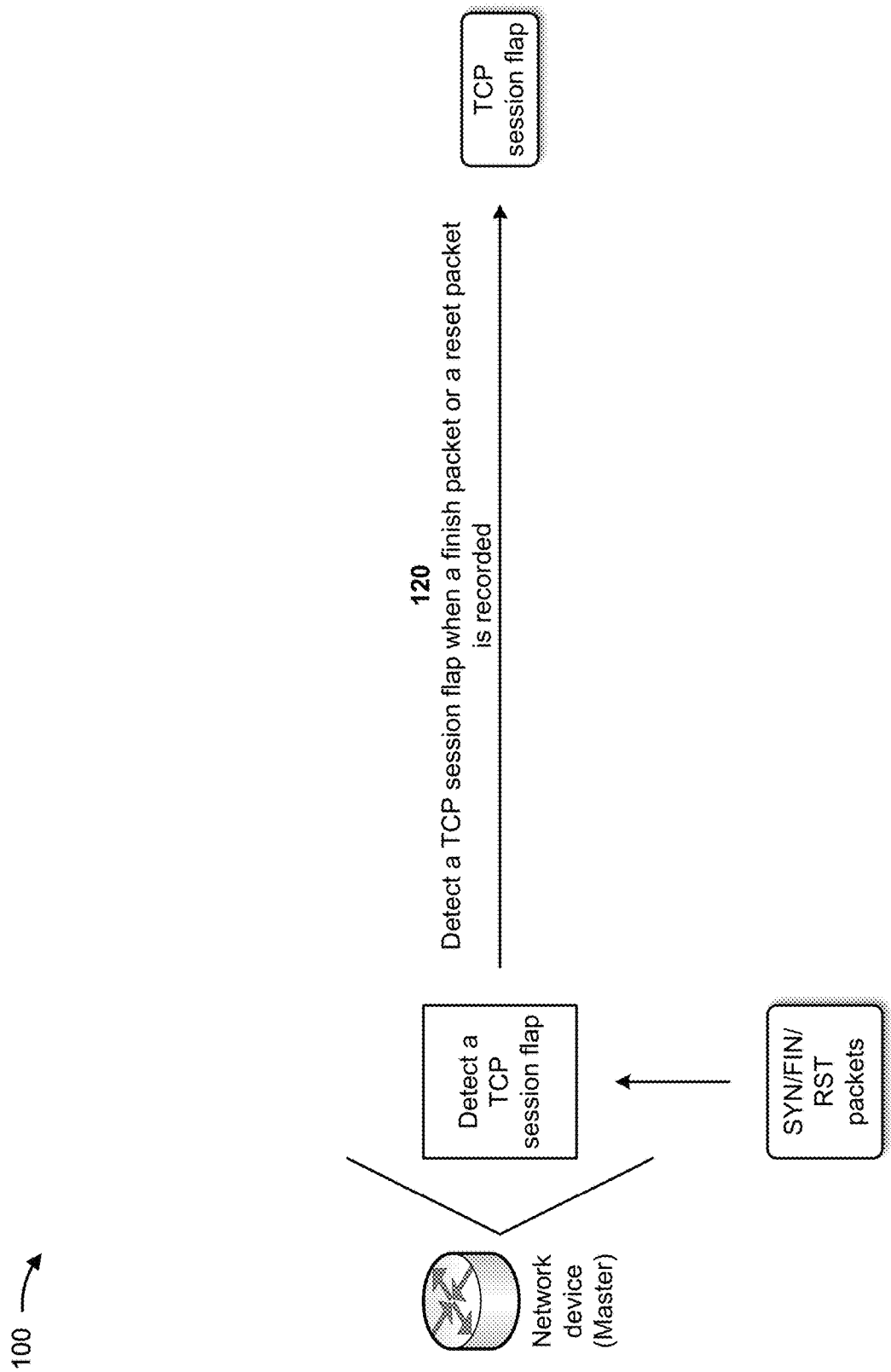

As shown in FIG. 1D, and by reference number 120, the network device may detect a TCP session flap when a finish packet or a reset packet is recorded. For example, the network device may determine whether at least one of the ingress and/or egress packets is a finish packet or a reset packet. When none of the ingress and/or egress packets are a finish packet or a reset packet, the network device may not detect a TCP session flap. When at least one of the ingress and/or egress packets is a finish packet or a reset packet, the network device may detect the TCP session flap, which may cause the network device to become unstable.

Figure 1E:
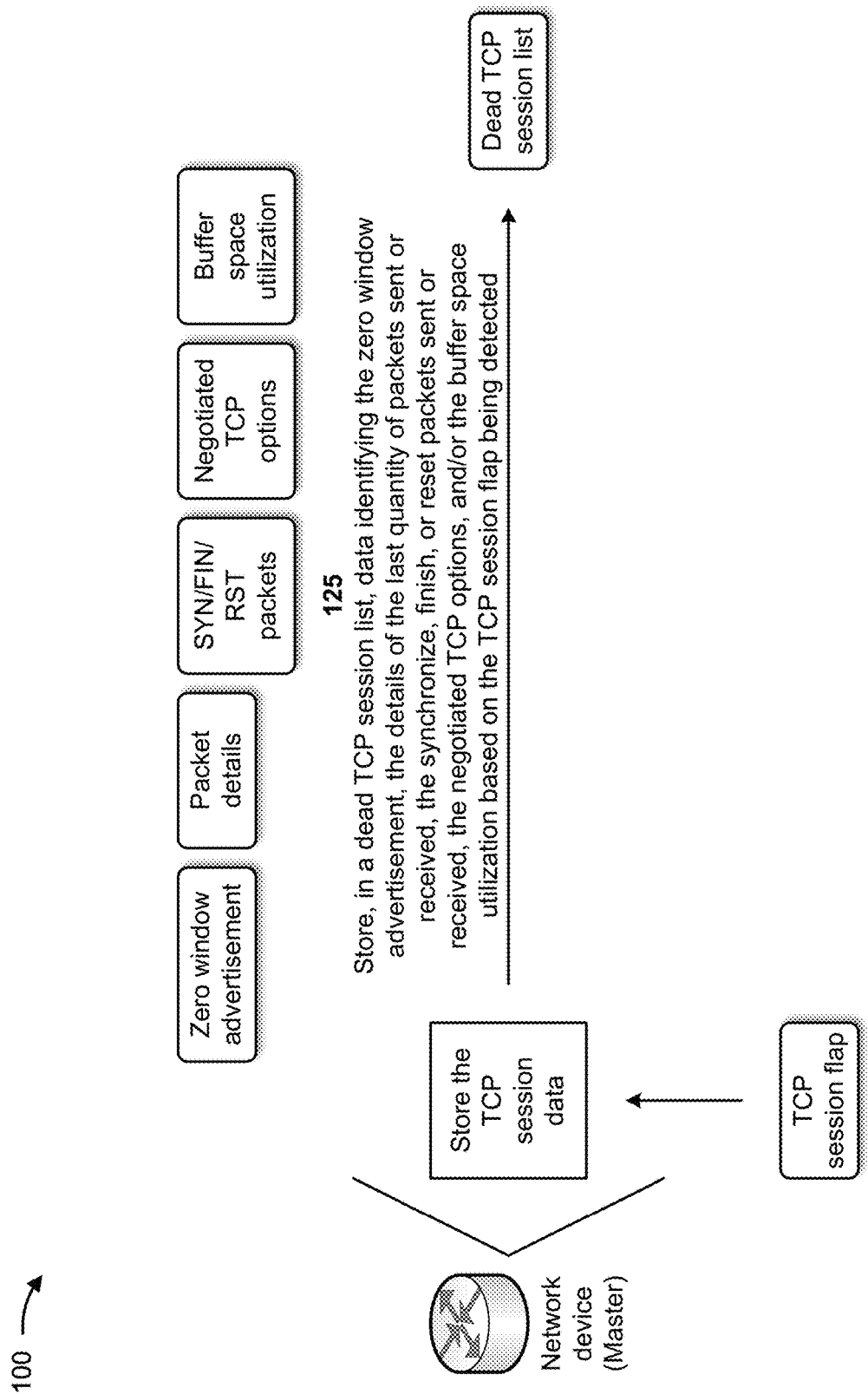

As shown in FIG. 1E, and by reference number 125, the network device may store, in a dead TCP session list, the data identifying the zero window advertisement, the details of the last quantity of packets sent or received, the synchronize, finish, or reset packets sent or received, the negotiated TCP options, and/or the buffer space utilization based on the TCP session flap being detected. For example, when the network device detects the TCP session flap, the network device may move or copy the data identifying the zero window advertisement, the details of the last quantity of packets sent or received, the synchronize packets sent or received, the negotiated TCP options, the buffer space utilization, and/or the like from the temporary storage to the dead TCP session list. In some implementations, the network device may store the dead TCP session list in a data structure (e.g., a database, a table, a list, and/or the like) associated with the network device. In some implementations, the network device may store, in the dead TCP session list, instantaneous data (e.g., socket buffer sizes, timestamp of the TCP session flap, and/or the like) collected at the time of the TCP session flap and historical data (e.g., zero windows, maximum duration and timestamp, last N zero windows, negotiated TCP options, and/or the like) that is continuously monitored.

As shown in FIG. 1F, and by reference number 130, the network device may utilize the zero window advertisement, of the dead TCP session list, to identify a slow application issue of the master network device or the peer network device. For example, the network device may utilize the data identifying the zero window advertisement, of the dead TCP session list, to identify the slow application issue associated with the network device or the peer network device. In some implementations, a continuous zero window advertisement by the peer network device may create backpressure on a send channel of the peer network device (e.g., which may slow an application). In some implementations, a continuous zero window advertisement by the master network device may indicate that an application on the master network device is not consuming data. In some implementations, the network device or the peer network device may correct the slow application issue associated with the network device or the peer network device.

As further shown in FIG. 1F, and by reference number 135, the network device may utilize the details of the last quantity of packets sent or received, from the dead TCP session list, to identify a sequence space issue, a TCP timestamp issue, or a retransmission issue. For example, the network device may utilize the data identifying the details of the last quantity of packets sent or received, from the dead TCP session list, to identify a TCP sequence space issue, a TCP timestamp issue, a TCP retransmission issue. With regard to the TCP sequence space issue, a 32-bit sequence number field may define a sequence number assigned to a first byte of data contained in a TCP segment. To ensure connectivity, each byte of data to be transmitted may be numbered with a sequence number. During connection establishment, each network may utilize a random number generator to create an initial sequence number, which may be different in each direction. With regard to the TCP timestamp issue, vulnerabilities in TCP timestamps may be found on networks and may be difficult to detect, difficult to resolve, or prone to being overlooked entirely. TCP retransmissions may be caused by network congestion. A large quantity of packets may be generated due to a TCP retransmission issue. If a percentage of traffic is above a particular threshold of total traffic, then the network device may be experiencing congestion. In some implementations, the network device may correct the sequence space issue, the TCP timestamp issue, and/or the retransmission issue.

As further shown in FIG. 1F, and by reference number 140, the network device may utilize the negotiated TCP options, of the dead TCP session list, to identify an out-of-sync issue. For example, the network device may utilize the data identifying the negotiated TCP options, of the dead TCP session list, to identify out-of-sync issues, such as the network device having selective acknowledgement enabled and the peer network device not having selective acknowledgement enabled, or vice versa. In some implementations, the network device may utilize the data identifying the negotiated TCP options, of the dead TCP session list, to identify an issue with a negotiated TCP option (e.g., a timestamp, a selective acknowledgment, security, and/or the like). In some implementations, the network device may correct the out-of-sync issue.

Figure 1G:
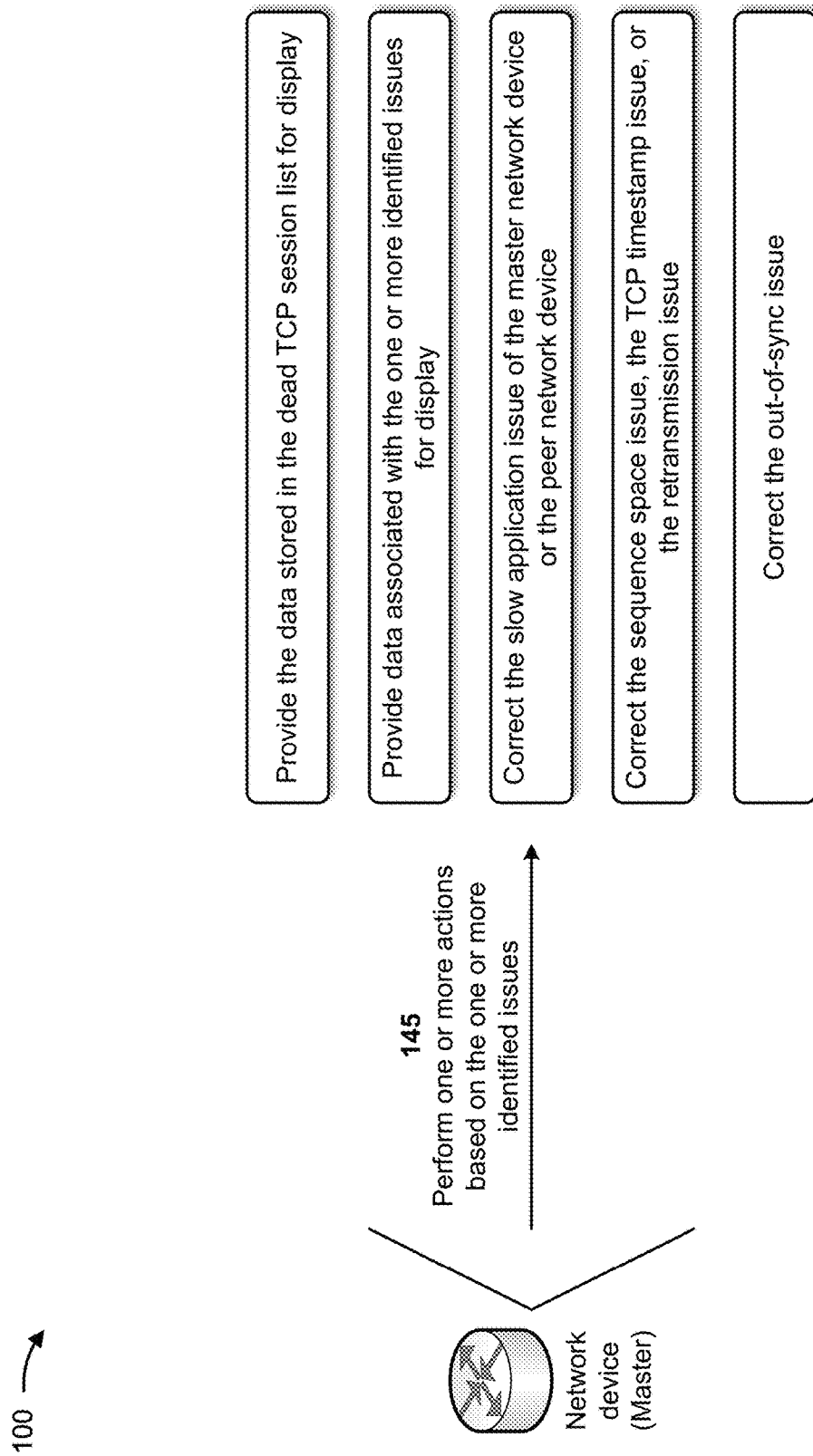

As shown in FIG. 1G, and by reference number 145, the network device may perform one or more actions based on the one or more identified issues. In some implementations, performing the one or more actions includes the network device providing the data stored in the dead TCP session list for display. For example, the network device may provide the data stored in the dead TCP session list to a user device (e.g., a computer, a mobile telephone, a laptop, and/or the like) associated with a network administrator. The user device may display the data stored on the dead TCP session list to the network administrator so that the network administrator may take corrective measures. In this way, the network device conserves computing resources, networking resources, and/or the like that would otherwise have been consumed by failing to identify the issue that causes the TCP session flap, failing to provide information associated with the TCP session flap, and/or the like.

In some implementations, performing the one or more actions includes the network device providing data associated with the one or more identified issues for display. For example, the network device may provide data associated with the slow application issue, the sequence space issue, the TCP timestamp issue, the retransmission issue, and/or the out-of-sync issue to the user device associated with the network administrator. The user device may display the data associated with the slow application issue, the sequence space issue, the TCP timestamp issue, the retransmission issue, and/or the out-of-sync issue to the network administrator so that the network administrator may take corrective measures. In this way, the network device conserves computing resources, networking resources, and/or the like that would otherwise have been consumed by failing to correct the TCP session flap due to the lack of information associated with the TCP session flap, losing a TCP session due to the TCP session flap, and/or the like.

In some implementations, performing the one or more actions includes the network device correcting the slow application issue of the master network device or the peer network device. For example, the network device may automatically correct the slow application issue, may dispatch a network technician to correct the slow application issue, may dispatch a robot to correct the slow application issue, and/or the like. In this way, the network device conserves computing resources, networking resources, and/or the like that would otherwise have been consumed by losing a TCP session due to the TCP session flap, losing traffic due to the TCP session flap, and/or the like.

In some implementations, performing the one or more actions includes the network device correcting the sequence space issue, the TCP timestamp issue, or the retransmission issue. For example, the network device may automatically correct the sequence issue, the TCP timestamp issue, and/or the retransmission issue, may dispatch a network technician to correct the sequence issue, the TCP timestamp issue, and/or the retransmission issue, may dispatch a robot to correct the sequence issue, the TCP timestamp issue, and/or the retransmission issue, and/or the like. In this way, the network device conserves computing resources, networking resources, and/or the like that would otherwise have been consumed by failing to correct the TCP session flap due to the lack of information associated with the TCP session flap, losing traffic due to the TCP session flap, and/or the like.

In some implementations, performing the one or more actions includes the network device correcting the out-of-sync issue. For example, the network device may automatically correct the out-of-sync issue, may dispatch a network technician to correct the out-of-sync issue, may dispatch a robot to correct the out-of-sync issue, and/or the like. In this way, the network device conserves computing resources, networking resources, and/or the like that would otherwise have been consumed by failing to identify the issue that causes the TCP session flap, losing a TCP session due to the TCP session flap, and/or the like.

Implementations described herein may be utilized with a tunable quantity and/or type of sessions for which information is to be recorded in the dead TCP session list. In some implementations, the network device may move or copy the data identifying the zero window advertisement, the details of the last quantity of packets sent or received, the synchronize packets sent or received, the negotiated TCP options, the buffer space utilization, and/or the like from the temporary storage to the dead TCP session list, via an interface between the temporary storage and the dead TCP session list. Although implementations described herein discussed the data identifying the zero window advertisement, the details of the last quantity of packets sent or received, the synchronize, finish, or reset packets sent or received, the negotiated TCP options, and/or the buffer space utilization, in other implementations, the data may identify interface level statistics, patterns, and congestion monitoring, protocol level behavior, nonstop-routing debugging, and/or the like.

In this way, the network device retains key parameters after a TCP session flap. For example, the network device (e.g., a master network device) may inspect TCP headers of ingress and/or egress packets and associated sockets and may record information associated with the packets and/or sockets based on the inspection. The information may include zero window advertisements in either direction (e.g., from or to a peer network device), time stamps associated with the packets, details associated with a last quantity of packets sent and/or received, TCP headers, synchronize packets, finish packets, and/or reset packets sent and/or received, negotiated TCP options, send/receive buffer space utilization, and/or the like. The network device may store the information in a dead TCP session list, may output the information, and/or may utilize the information to identify issues associated with the network device. Thus, the network device conserves computing resources, networking resources, and/or the like that would otherwise have been consumed by identifying the issue that causes the TCP session flap, failing to provide information associated with the TCP session flap, failing to correct the TCP session flap due to the lack of information associated with the TCP session flap, losing a TCP session due to the TCP session flap, losing traffic due to the TCP session flap, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-IG. Furthermore, two or more devices shown in FIGS. 1A-IG may be implemented within a single device, or a single device shown in FIGS. 1A-1G may be implemented as multiple, distributed devices. Additionally, or alternatively, a set of devices (e.g., one or more devices) shown in FIGS. 1A-IG may perform one or more functions described as being performed by another set of devices shown in FIGS. 1A-1G.

Figure 2:
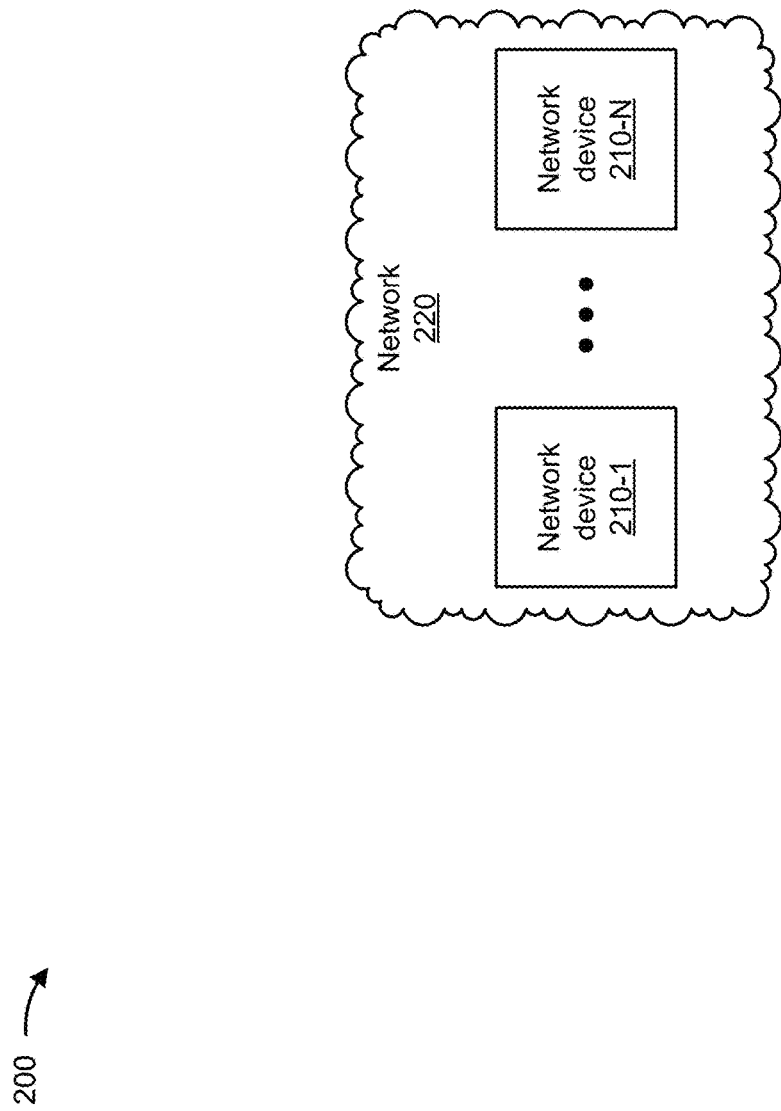
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 210 (shown as network device 210-1 through network device 210-N) and a network 220. Devices of the environment 200 may interconnect via wired connections, wireless connections, or a combination of wired and wireless connections.

The network device 210 includes one or more devices capable of receiving, processing, storing, routing, and/or providing traffic (e.g., a packet or other information or metadata) in a manner described herein. For example, the network device 210 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 210 may include a gateway, a switch, a firewall, a hub, a bridge, a reverse proxy, a server (e.g., a proxy server, a cloud server, or a data center server), a load balancer, and/or a similar device. In some implementations, the network device 210 may be a physical device implemented within a housing, such as a chassis. In some implementations, the network device 210 may be a virtual device implemented by one or more computer devices of a cloud computing environment or a data center. In some implementations, a group of network devices 210 may be a group of data center nodes that are used to route traffic flow through the network 220.

The network 220 includes one or more wired and/or wireless networks. For example, the network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (NAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
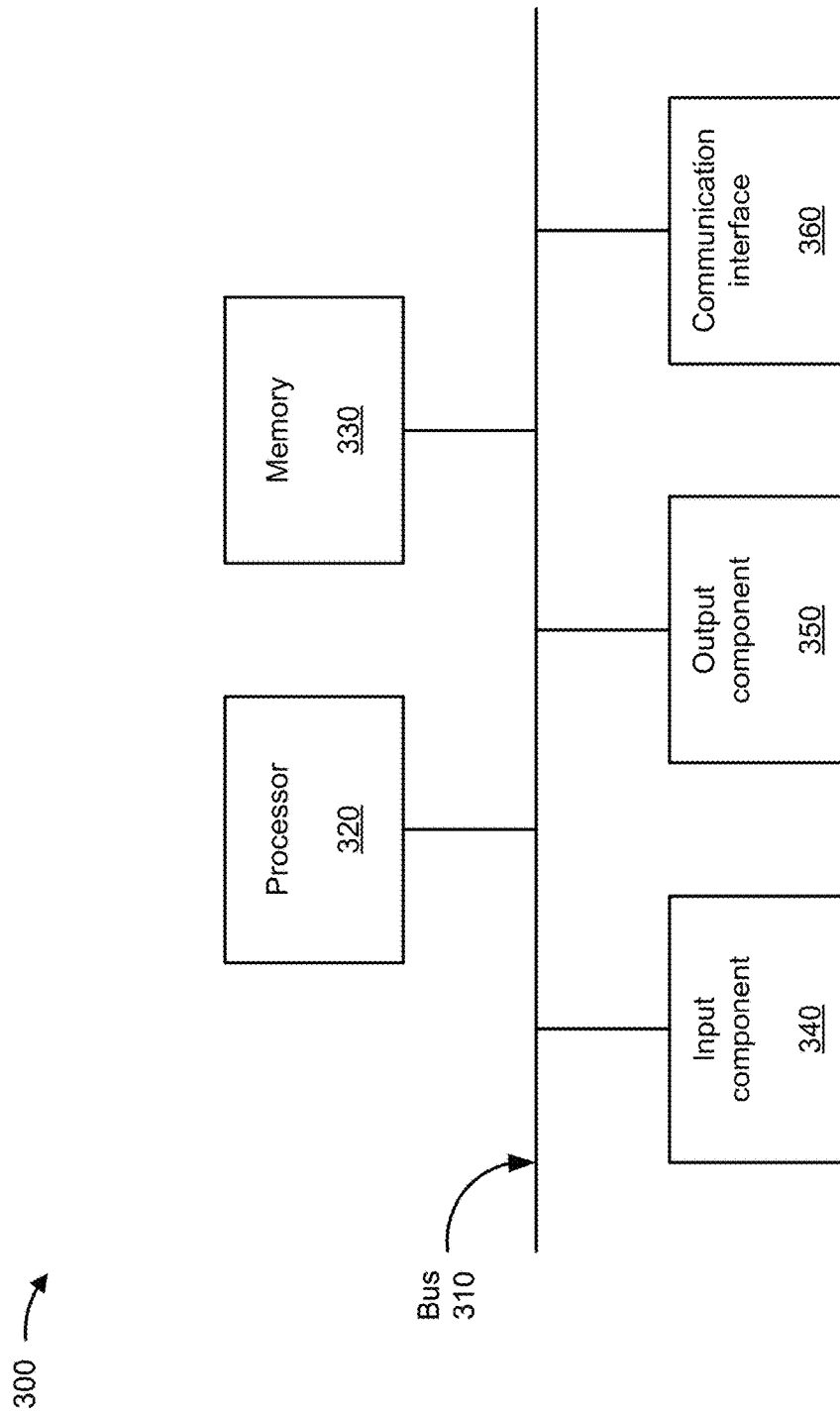
FIGS. 3 and 4 are diagrams of example components of one or more devices of FIG. 2.

FIG. 3 is a diagram of example components of one or more devices of FIG. 2. The example components may be included in a device 300, which may correspond to the network device 210. In some implementations, the network device 210 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
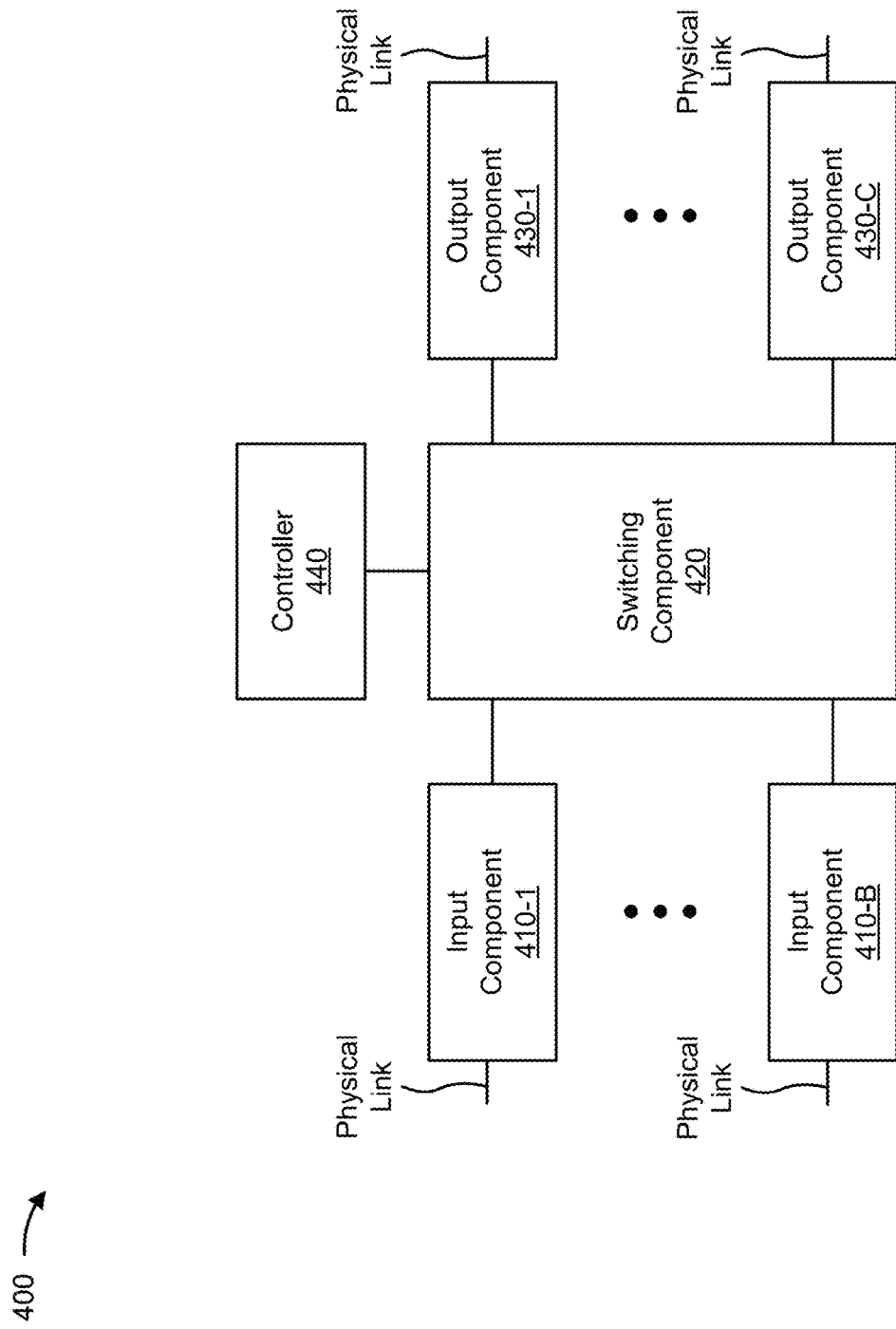

FIG. 4 is a diagram of example components of one or more devices of FIG. 2. The example components may be included in a device 400. The device 400 may correspond to the network device 210. In some implementations, the network device 210 may include one or more devices 400 and/or one or more components of the device 400. As shown in FIG. 4, the device 400 may include one or more input components 410-1 through 410-B ($B \geq 1$) (hereinafter referred to collectively as input components 410, and individually as input component 410), a switching component 420, one or more output components 430-1 through 430-C ($C \geq 1$) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for retaining key parameters after a TCP session flap. In some implementations, one or more process blocks of FIG. 5 may be performed by a network device (e.g., the network device 210). In some implementations, one or more process blocks of FIG. 5 may be performed by another device or a group of devices separate from or including the network device. Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include monitoring a TCP session with another network device (block 510). For example, the network device may monitor a TCP session with another network device, as described above.

As further shown in FIG. 5, process 500 may include identifying ingress and/or egress packets, a TCP header, and a socket of the TCP session (block 520). For example, the network device may identify ingress and/or egress packets, a TCP header, and a socket of the TCP session, as described above.

As further shown in FIG. 5, process 500 may include inspecting the ingress and/or egress packets, the TCP header, and the socket to identify one or more of a zero window advertisement, details of a last quantity of packets sent or received, synchronize, finish, or reset packets sent or received, negotiated TCP options, or buffer space utilization (block 530). For example, the network device may inspect the ingress and/or egress packets, the TCP header, and the socket to identify one or more of a zero window advertisement, details of a last quantity of packets sent or received, synchronize, finish, or reset packets sent or received, negotiated TCP options, or buffer space utilization, as described above. In some implementations, the zero window advertisement provides an indication of a slow application issue of the network device or the other network device. In some implementations, the details of the last quantity of packets sent or received provide an indication of a sequence space issue, a TCP timestamp issue, or a retransmission issue. In some implementations, the negotiated TCP options provide an indication of an out-of-sync issue.

As further shown in FIG. 5, process 500 may include temporarily recording the one or more of the zero window advertisement, the details of the last quantity of packets sent or received, the synchronize, finish, or reset packets sent or received, the negotiated TCP options, or the buffer space utilization (block 540). For example, the network device may temporarily record the one or more of the zero window advertisement, the details of the last quantity of packets sent or received, the synchronize, finish, or reset packets sent or received, the negotiated TCP options, or the buffer space utilization, as described above.

As further shown in FIG. 5, process 500 may include detecting a TCP session flap when a finish packet or a reset packet is identified and recorded (block 550). For example, the network device may detect a TCP session flap when a finish packet or a reset packet is identified and recorded, as described above.

As further shown in FIG. 5, process 500 may include storing, in a dead TCP session list, data identifying the one or more of the zero window advertisement, the details of the last quantity of packets sent or received, the synchronize, finish, or reset packets sent or received, the negotiated TCP options, or the buffer space utilization based on the TCP session flap being detected (block 560). For example, the network device may store, in a dead TCP session list, data identifying the one or more of the zero window advertisement, the details of the last quantity of packets sent or received, the synchronize, finish, or reset packets sent or received, the negotiated TCP options, or the buffer space utilization based on the TCP session flap being detected, as described above. In some implementations, storing, in the dead TCP session list, the data identifying the one or more of the zero window advertisement, the details of the last quantity of packets sent or received, the synchronize, finish, or reset packets sent or received, the negotiated TCP options, or the buffer space utilization includes utilizing an interface to store, in the dead TCP session list, the data identifying the one or more of the zero window advertisement, the details of the last quantity of packets sent or received, the synchronize, finish, or reset packets sent or received, the negotiated TCP options, or the buffer space utilization.

In some implementations, process 500 includes utilizing the zero window advertisement, of the dead TCP session list, to identify a slow application issue of the network device or the other network device, and providing data identifying the slow application issue for display. In some implementations, process 500 includes correcting the slow application issue of the network device or the other network device.

In some implementations, process 500 includes utilizing the details of the last quantity of packets sent or received, of the dead TCP session list, to identify a sequence space issue, a TCP timestamp issue, or a retransmission issue, and providing data identifying the sequence space issue, the TCP timestamp issue, or the retransmission issue for display. In some implementations, process 500 includes correcting the sequence space issue, the TCP timestamp issue, or the retransmission issue.

In some implementations, process 500 includes utilizing the negotiated TCP options, of the dead TCP session list, to identify an out-of-sync issue, and providing data identifying the out-of-sync issue for display. In some implementations, process 500 includes correcting the out-of-sync issue.

In some implementations, process 500 includes identifying the TCP session based on one or more of a network address associated with the network device or the other network device, a port associated with the network device or the other network device, or a virtual routing and forwarding identifier associated with the network device or the other network device. In some implementations, process 500 includes setting a quantity and types of TCP sessions to store in the dead TCP session list, wherein the TCP session satisfies the quantity and one of the types of TCP sessions to store in the dead TCP session list.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   monitoring, by a network device, a transmission control protocol (TCP) session with an other network device;
   identifying, by the network device, a TCP header, a socket of the TCP session, and one or more of a set of ingress packets or a set of egress packets;
   inspecting, by the network device, the TCP header, the socket, and the one or more of the set of ingress packets or the set of egress packets to identify session information,
      wherein the session information includes negotiated TCP options associated with the TCP session and one or more of a finish packet or a reset packet;
   detecting, by the network device, a TCP session flap based on the session information including the one or more of the finish packet or the reset packet;
   storing, by the network device and in a dead TCP session list, data identifying the session information based on the TCP session flap being detected; and
   identifying, by the network device and based on the negotiated TCP options, an out-of-sync issue,
      wherein the out-of-sync issue corresponds to the network device having selective acknowledgement enabled and the other network device not having selective acknowledgement enabled.

2. The method of claim 1, wherein the session information includes a zero window advertisement, the method further comprising:
   utilizing the zero window advertisement to identify a slow application issue of the network device or the other network device; and
   providing data identifying the slow application issue for display.

3. The method of claim 2, further comprising:
   correcting the slow application issue of the network device or the other network device.

4. The method of claim 1, wherein the session information includes at least one of:
   details of a last quantity of packets sent, or
   details of a last quantity of packets received,
      wherein the method further comprises:
         utilizing the at least one of the details of the last quantity of packets sent or the details of the last quantity of packets received to identify a sequence space issue, a TCP timestamp issue, or a retransmission issue; and
         providing data identifying the sequence space issue, the TCP timestamp issue, or the retransmission issue for display.

5. The method of claim 4, further comprising:
   correcting the sequence space issue, the TCP timestamp issue, or the retransmission issue.

6. The method of claim 1, wherein the method further comprises:
   providing data identifying the out-of-sync issue for display.

7. The method of claim 6, further comprising:
   correcting the out-of-sync issue.

8. A network device, comprising:
   one or more memories; and
   one or more processors to:
      monitor a transmission control protocol (TCP) session with an other network device;
      identify a TCP header, a socket of the TCP session, and one or more of a set of ingress packets or a set of egress packets;
      inspect the TCP header, the socket, and the one or more of the set of ingress packets or the set of egress packets to identify session information,
         wherein the session information includes negotiated TCP options associated with the TCP session and one or more of a finish packet or a reset packet;
      detect a TCP session flap based on the session information including the one or more of the finish packet or the reset packet;
      store, in a dead TCP session list, data identifying the session information based on the TCP session flap being detected; and
      identify, based on the negotiated TCP options, an out-of-sync issue,
         wherein the out-of-sync issue corresponds to the network device having selective acknowledgement enabled and the other network device not having selective acknowledgement enabled.

9. The network device of claim 8, wherein the one or more processors are further to:
   identify the TCP session based on one or more of:
      a network address associated with the network device or the other network device,
      a port associated with the network device or the other network device, or
      a virtual routing and forwarding identifier associated with the network device or the other network device.

10. The network device of claim 8, wherein the one or more processors, to store, in the dead TCP session list, the data identifying the session information, are to:
    utilize an interface to store, in the dead TCP session list, the data identifying the session information.

11. The network device of claim 8, wherein the session information includes a zero window advertisement, and wherein the zero window advertisement provides an indication of a slow application issue of the network device or the other network device.

12. The network device of claim 8, wherein the session information includes details of a last quantity of packets sent or a last quantity of packets received, and wherein the details of the last quantity of packets sent or the last quantity of packets received provide an indication of a sequence space issue, a TCP timestamp issue, or a retransmission issue.

13. The network device of claim 8, wherein the one or more processors are further configured to:
    provide an indication of the out-of-sync issue.

14. The network device of claim 8, wherein the one or more processors are further to:
    set a quantity and types of TCP sessions to store in the dead TCP session list,
       wherein the TCP session satisfies the quantity and one of the types of TCP sessions to store in the dead TCP session list.

15. A non-transitory computer-readable medium storing a set of instructions, the set of instructions comprising:
one or more instructions that, when executed by one or more processors of a network device, cause the network device to:
monitor a transmission control protocol (TCP) session with an other network device;
identify a TCP header, a socket of the TCP session, and one or more of a set of ingress packets or a set of egress packets;
inspect the TCP header, the socket, and the one or more of the set of ingress packets or the set of egress packets to identify session information,
wherein the session information includes negotiated TCP options associated with the TCP session and one or more of a finish packet or a reset packet;
detect a TCP session flap based on the session information including the one or more of the finish packet or the reset packet;
store, in a dead TCP session list, data identifying the session information based on the TCP session flap being detected; and
utilize, based on the TCP session flap being detected, the negotiated TCP options to identify an out-of-sync issue,
wherein the out-of-sync issue corresponds to the network device having selective acknowledgement enabled and the other network device not having selective acknowledgement enabled.

16. The non-transitory computer-readable medium of claim 15, wherein the session information includes a zero window advertisement, and wherein the one or more instructions further cause the network device to:
utilize the zero window advertisement to identify a slow application issue of the network device or the other network device, and
correct the slow application issue of the network device or the other network device.

17. The non-transitory computer-readable medium of claim 15, wherein the session information includes one or more of details of a last quantity of packets sent or details of a last quantity of packets received, and wherein the one or more instructions further cause the network device to:
utilize the details of the last quantity of packets sent or the details of the last quantity of packets received to identify a sequence space issue, a TCP timestamp issue, or a retransmission issue; and
correct the sequence space issue, the TCP timestamp issue, or the retransmission issue.

18. The non-transitory computer-readable medium of claim 15, wherein the one or more instructions further cause the network device to:
correct the out-of-sync issue.

19. The non-transitory computer-readable medium of claim 15, wherein the one or more instructions further cause the network device to:
identify the TCP session based on one or more of:
a network address associated with the network device or the other network device,
a port associated with the network device or the other network device, or
a virtual routing and forwarding identifier associated with the network device or the other network device.

20. The non-transitory computer-readable medium of claim 15, wherein the session information includes a zero window advertisement, details of a last quantity of packets sent, details of a last quantity of packets received, and an indication of one or more negotiated TCP options, and
wherein the zero window advertisement provides an indication of a slow application issue of the network device or the other network device,
wherein the one or more of the details of the last quantity of packets sent or the details of the last quantity of packets received provide an indication of a sequence space issue, a TCP timestamp issue, or a retransmission issue, and
wherein the one or more negotiated TCP options provide an indication of an out-of-sync issue.

* * * * *